United States Patent [19]

Lippert et al.

[11] 4,104,055

[45] Aug. 1, 1978

[54] PROCESS FOR WORKING UP COPPER CEMENTATE SLUDGES

[75] Inventors: Karl Lippert; Heinz Planken, both of Duisburg, Germany

[73] Assignee: Duisburger Kupferhutte, Duisburg, Germany

[21] Appl. No.: 452,484

[22] Filed: Mar. 18, 1974

[30] Foreign Application Priority Data

Mar. 29, 1973 [DE] Fed. Rep. of Germany ....... 2315614

[51] Int. Cl.$^2$ .......................... C22B 1/00; C22B 1/11
[52] U.S. Cl. .......................................... 75/1 R; 75/6; 75/21; 75/101 R
[58] Field of Search ...................... 75/1, 21, 6, 24, 101

[56] References Cited

U.S. PATENT DOCUMENTS

| | | | |
|---|---|---|---|
| 2,316,330 | 4/1943 | Hawk | 75/21 |
| 2,639,974 | 5/1953 | Ross | 75/21 |
| 3,230,071 | 1/1966 | Marvin | 75/101 R |
| 3,330,648 | 7/1967 | Vian-Ortuno | 75/1 |
| 3,367,740 | 4/1968 | Zubryckyj | 75/101 R |
| 3,402,041 | 9/1968 | Feld | 75/101 R |
| 3,409,427 | 11/1968 | Bonnivard | 75/101 R |
| 3,493,365 | 2/1970 | Pickering | 75/101 R |

Primary Examiner—P. D. Rosenberg
Attorney, Agent, or Firm—Burgess, Dinklage & Sprung

[57] ABSTRACT

A process for recovering metallic values from arsenic-containing copper cementate sludges. The cementate is admixed with lime in an amount sufficient to form calcium sulfate by reaction with any water-soluble sulfate present in the cementate, and calcium arsenate from the arsenic present in the cementate. The admixture is roasted in an oxygen-containing atmosphere at a temperature above about 300° C, to oxidize the metallic values to a state in which said values are soluble in aqueous acid. The roasted material is leached with aqueous acid to dissolve said values. The values can be recovered from the solution produced in the leaching step by known procedures. By the process of the invention, polluting by arsenic is prevented.

9 Claims, No Drawings

PROCESS FOR WORKING UP COPPER CEMENTATE SLUDGES

BACKGROUND

The present invention concerns a process for working up copper cementate sludges containing arsenic which are obtained, for example, in purifying zinc solutions by means of cementation with zinc dust. Normally, these sludges contain not only copper, but also other valuable metals, especially non-ferrous metals, such as, for example, zinc, cadmium, and silver.

Working up with the aid of pyrometallurgical processes is expensive on account of the composition of these sludges which contain approximately 15–30% Cu, 10–25% Zn, and 2–6% As.

In view of the fact that the copper is present in its metallic form and in the form of arsenide, respectively, working up in the hydrometallurgical manner begins by requiring an oxidizing dissolution such as, for example, with chlorine or air, with considerable amounts of expensive oxidizing agents being required in the former case, and with the oxidizing velocity being relatively low in the latter case.

THE INVENTION

A process has now been discovered which does not have the disadvantages mentioned above, and which comprises the following features: after being mixed with an amount of lime, equivalent to the arsenic content and, as the case may be, to the water-soluble sulphate content, for the purpose of forming of calcium arsenate, $Ca_3(AsO_4)_2$, and calcium sulphate, $CaSO_4$, respectively, the moist ore is roasted in an atmosphere containing oxygen, at temperatures above 300° C, preferably at 400°–500° C; the roasted ore, thus obtained, is leached with diluted acids for the purpose of extracting the valuable metallic constituents, and the extraction solution, thus obtained, is worked up in the known manner for the valuable individual constituents to be recovered. In being subjected to roasting, each valuable constituent is almost completely rendered quantitatively and can readily be extracted by means of subsequent leaching with acids.

The addition of lime in accordance with the present invention is necessary because roasting with air or other oxygen-containing gas without an addition of lime would result in a considerable proportion of the arsenic being volatilized. That would necessitate a careful washing of the gas as well as a working up of the arsenic-containing washing solution, e.g., for arsenic, which would be expensive operations.

The amount of lime, required for the volatilization of the As to be prevented during the roasting process, is dependent upon the arsenic content and the water-soluble sulphate content. The zinc content in the sludge is largely present in the form of $ZnSO_4$ which binds the lime according to $$ZnSO_4 + Ca(OH)_2 \rightarrow CaSO_4 + Zn(OH)_2.$$

It is only this porportion of the lime, exceeding the amount of lime required for the formation of gypsum, which can be used for the binding of the arsenic in the form of calcium arsenate. Additions of $\approx$ 8–12% lime are sufficient for the usual content of arsenic and sulphate. If further amounts of lime are added to the sludge in excess of that — a total of about 17–25% depending upon the degree of wetness — the mixed product will become crumbly and capable of trickling. In this state it is considerably easier to charge into the roasting unit and to treat in this roasting unit than it would be if it took the form of sludge. Instead of additional lime, other inert materials, binding water, could also be added to make the material lumpy.

For example, a kollergang (edge mill) is a unit well suited for mixing the sludge, and subsequently making it lumpy, with lime. The use for the roasting process of a multiple hearth furnace has stood the test, but there can also be used other conventional roasting units such as, for example, rotary tube furnaces or fluidized bed furnaces.

The valuable constituents are extracted from the roasted ore by subsequent leaching with acids. This extraction is effected within a very short time, for example, within 20–30 minutes in the case of leaching with the aid of a stirring apparatus. If there has been no quantitative oxidation during the roasting with air, the addition of small amounts of powerful oxidizing agents, such as, for example, $Cl_2$, can be effected during leaching for the purpose of residual oxidation. The valuable constituents in the solution can be recovered by the known hydrometallurgical processes.

The addition of acid during leaching is preferably so dosed that, after leaching, there is present in the extraction solution a small excess of free acid. If leaching is effected with diluted sulphuric acid, the calcium content in the roasted ore remains in the residue to a very large extent in the form of gypsum. In the case of a worth-while Ag content, NaCl may be added to the sulphuric acid in order to effect a better yield of Ag. Silver will then be in solution as a complex of chlorine. The amount of NaCl to be added depends on the starting content of Ag; normally, additions of NaCl within the range of 30–100 g/l are sufficient. In leaching with hydrochloric acid the concentration of chlorine ions is normally so high anyway that the silver can very largely be extracted without any additions of NaCl.

EXAMPLE

In a kollergang, 0.6 kg of white lime was added to 7.5 kg of copper cementate sludge with a wetness content of 40%, with a homogeneous mixture being effected within five minutes. Then another 0.6 kg of white lime was added to this doughy mixture. After a kneading period of 1½ minutes there was obtained a crumbly kind of material easy to discharge. A sieve analysis showed the following fractions:

| mm | % |
|---|---|
| < 2 | 7 |
| 2–12 | 46 |
| 12–20 | 25 |
| >20 | 22 |

A sample of the material was dried at 105° C, and, subsequently, it had the following composition:

| | % |
|---|---|
| Cu | 20.3 |
| Zn | 15.0 |
| Cd | 1.43 |
| As | 2.71 |
| $SO_4$—S | 6.10 |
| $Ca(OH)_2$ | 20.5 |

The crumbly and moist ore was roasted with air in a laboratory rabble furnace at 500° C. The detention time was three hours. The amount of As, discharged with the waste roasting gas, amounted to 0.003 g/kg of charged ore.

The roasted ore had the following values:

|     | %      |
| --- | ------ |
| Cu  | 21.45  |
| Zn  | 15.93  |
| Cd  | 1.52   |
| As  | 2.88   |
| CaO | 16.45  |
| Ag  | 87 g/t |

This roasted ore was subjected to the following leaching experiments;

a. 100 g of roasted ore were conveyed into 1.1 of diluted sulphuric acid (100 g of $H_2SO_4$/l) and leached for 30 minutes at 80° C, with stirring being effected. After filtration, washing, and drying, there was obtained a residue (filter cake) of 47.5 g. Its composition and the corresponding yield of values, in the filtrate and the wash water, are shown in the following table:

|    | %       | corresponding to a yield of % |
| -- | ------- | ----------------------------- |
| Cu | 0.30    | 99.3                          |
| Zn | 0.84    | 97.5                          |
| Cd | 0.12    | 96.2                          |
| Ag | 162 g/t | 11.5                          | b. The leaching experiment, described in (a), was repeated, but there was an addition of 50 g of NaCl. There was obtained a residue of 46.7 g:

|    | %      | corresponding to a yield of % |
| -- | ------ | ----------------------------- |
| Cu | 0.25   | 99.4                          |
| Zn | 0.57   | 98.3                          |
| Cd | 0.085  | 97.4                          |
| Ag | 32 g/t | 83                            | c. 100 g of roasted ore were leached in 0.7 l of hydrochloric acid (110 g of HCl/l) for 30 minutes at 80° C, with stirring being effected. They were then filtered, washed, and dried. There remained a residue of 16.0 g with the following composition and yield:

|    | %      | corresponding to a yield of % |
| -- | ------ | ----------------------------- |
| Cu | 0.16   | 99.9                          |
| Zn | 0.54   | 99.5                          |
| Cd | 0.12   | 98.7                          |
| Ag | 30 g/t | 94.5                          |

The aqueous acids for use in the practice of the invention are, for example, sulfuric or hydrochloric and other inorganic acids. Dilute acids, are particularly contemplated. As mentioned, the use of a small excess of acid is desirable.

The amount of lime used is suitably, in general, a chemical equivalent amount. A stoichiometric excess of about 1.1–2 times can be used. The lime used for the chemical reactions with arsenic, and such water-soluble sulfate as is present, is generally 5–40 wt. % of the cementate (dry basis). A further 5–40 wt. % of lime is desirably used (also cementite, dry basis) in order to produce a crumbly product. The moisture content of the cementate when admixed with the lime for the production of a crumbly product is desirably 20–50% of the cementate.

The invention is effective to prevent pollution of the atmosphere by arsenic in the roasting step. By practice of the invention the arsenic in the roaster gas can be maintained below 0.005 or even 0.007 g/kg of charged ore (dry basis).

Herein, % is weight percent unless otherwise indicated.

What is claimed is:

1. A process for recovering metallic values from arsenic-containing copper cementate sludges, which comprises:
   a. admixing the cementate with lime in an amount sufficient to form calcium sulfate by reaction with any water-soluble sulfates present in the cementate, and calcium arsenate from the arsenic present in the cementate,
   b. roasting the admixture produced in step (a) in an oxygen-containing atmosphere at a temperature above about 300° C, to oxidize the metallic values to a state in which said values are soluble in aqueous acid,
   c. leaching the roasted material produced in step (b) with aqueous acid to dissolve said values.

2. Process according to claim 1, the cementate being wet during the admixing of step (a).

3. Process according to claim 1, the roasting temperature being about 400°–500° C.

4. Process according to claim 1, wherein the admixture formed in step (a) is wet and the proportion of water and lime is such that the admixture produced in step (a) is crumbly.

5. Process according to claim 1, the roasting being performed in a multiple hearth furnace.

6. Process according to claim 1, wherein the values include silver and including a metal chloride in the material leached to increase the extraction of silver.

7. Process according to claim 1, wherein the values include silver, and the aqueous acid is hydrochloric acid.

8. Process according to claim 1, the roasting temperature being 300°–500° C.

9. Process according to claim 1, the cementate containing copper, zinc, and silver.

* * * * *

UNITED STATES PATENT AND TRADEMARK OFFICE
CERTIFICATE OF CORRECTION

PATENT NO. : 4,104,055
DATED : August 1, 1978
INVENTOR(S) : Karl Lippert and Heinz Planken It is certified that error appears in the above-identified patent and that said Letters Patent are hereby corrected as shown below:

Col. 3, line 18, change "1.1" to -- 1 1 --.

Signed and Sealed this

First Day of May 1979

[SEAL]

Attest:

RUTH C. MASON
Attesting Officer

DONALD W. BANNER
Commissioner of Patents and Trademarks